(12) United States Patent
Singer et al.

(10) Patent No.: US 10,281,698 B2
(45) Date of Patent: May 7, 2019

(54) LASER SCANNING MICROSCOPE AND METHOD FOR CORRECTING IMAGING ERRORS PARTICULARLY IN HIGH-RESOLUTION SCANNING MICROSCOPY

(71) Applicant: Carl Zeiss Microscopy GmbH, Jena (DE)

(72) Inventors: Wolfgang Singer, Aalen (DE); Jorg Petschulat, Jena (DE); Stefan Richter, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 24 days.

(21) Appl. No.: 14/490,890

(22) Filed: Sep. 19, 2014

(65) Prior Publication Data

US 2015/0077844 A1 Mar. 19, 2015

Related U.S. Application Data

(60) Provisional application No. 62/025,657, filed on Jul. 17, 2014.

(30) Foreign Application Priority Data

Sep. 19, 2013 (DE) .................. 10 2013 218 795

(51) Int. Cl.
*G02B 21/00* (2006.01)
*G02B 27/58* (2006.01)

(52) U.S. Cl.
CPC ....... *G02B 21/0032* (2013.01); *G02B 21/008* (2013.01); *G02B 21/0072* (2013.01); *G02B 21/0076* (2013.01); *G02B 27/58* (2013.01)

(58) Field of Classification Search
CPC ..... G02B 6/3664–6/3672; G02B 21/00; G02B 21/0004; G02B 21/002–21/0084;
(Continued)

(56) References Cited

U.S. PATENT DOCUMENTS 5,149,972 A * 9/1992 Fay ................... G01N 21/6458
250/372
7,224,523 B2 5/2007 Fukuyama et al.
(Continued)

FOREIGN PATENT DOCUMENTS

EP 1 253 457 B1 10/2002
EP 2 317 362 A1 5/2011
(Continued)

OTHER PUBLICATIONS

Tehrani et al. "Point spread function optimization for STORM using adaptive optics" Proc. SPIE 8978, MEMS Adaptive Optics VIII (Mar. 7, 2014).*
(Continued)

*Primary Examiner* — Stephone B Allen
*Assistant Examiner* — James McGee
(74) *Attorney, Agent, or Firm* — Duane Morris LLP

(57) ABSTRACT

A laser scanning microscope (SR-LSM) and a method for correcting imaging errors in a laser scanning microscope. The SR-LSM includes an illumination device for providing an illumination spot; a scanner for moving the illumination spot to consecutive scanning positions over a sample to be examined; an adaptive optics unit for controlling a wavefront of the illumination spot with a control device and a detector for determining a spatially resolved imaging spot emitted by the sample. An evaluation unit is provided for determining a point-spread function (PSF) of the imaging spot at each scanning position, whereby a wavefront correction signal determined from the point-spread function
(Continued)

(PSF) of a scanning position is supplied to the control device of the adaptive optics unit or is used in digital post-processing of the microscope image (e.g. by means of deconvolution).

11 Claims, 4 Drawing Sheets

(58) Field of Classification Search
CPC ... G02B 21/0096; G02B 21/06–21/125; G02B 21/24–21/247; G02B 21/36–21/367; G02B 26/0816–26/0866; G02B 27/58; G06T 3/4053; G06T 3/4069–3/4076; G06T 5/00–5/004; G06T 5/006; G06T 5/50; G06K 9/6202–9/621; G06K 9/6215
USPC .......... 359/223.1–224.1, 291–295, 298, 359/315–316, 318, 319, 368–390, 618, 359/619, 625–628, 798–800, 850, 855; 385/115, 116, 119, 120, 121; 382/209–211, 217–220, 254–255, 382/260–261, 275; 702/109–110, 702/189–191, 194, 199
See application file for complete search history.

(56) References Cited

U.S. PATENT DOCUMENTS

2004/0223214 A1    11/2004  Atkinson
2005/0265621 A1*   12/2005  Biggs ................... G06T 5/002
                                                    382/260
2013/0278744 A1*   10/2013  Debarre ................ G02B 21/06
                                                    348/79

FOREIGN PATENT DOCUMENTS

JP      2008 026643 A       2/2008
WO      WO 2012069749 A1 *  5/2012  ............ G02B 21/06

OTHER PUBLICATIONS

Izeddin et al. "PSF shaping using adaptive optics for three-dimensional single-molecule super-resolution imaging and tracking" Optics express 20(5):4957-67 (Feb. 27, 2012).*
Debarre et al. "Image-based adaptive optics for two-photon microscopy" Optics letters 34(16):2495-7 (Aug. 15, 2009).*
Booth et al. "Adaptive aberration correction in a confocal microscope." Proceedings of the National Academy of Sciences 99(9):5788-92 (Apr. 30, 2002).*
PCT Notification of Transmittal of Translation of the International Preliminary Report on Patentability.

* cited by examiner

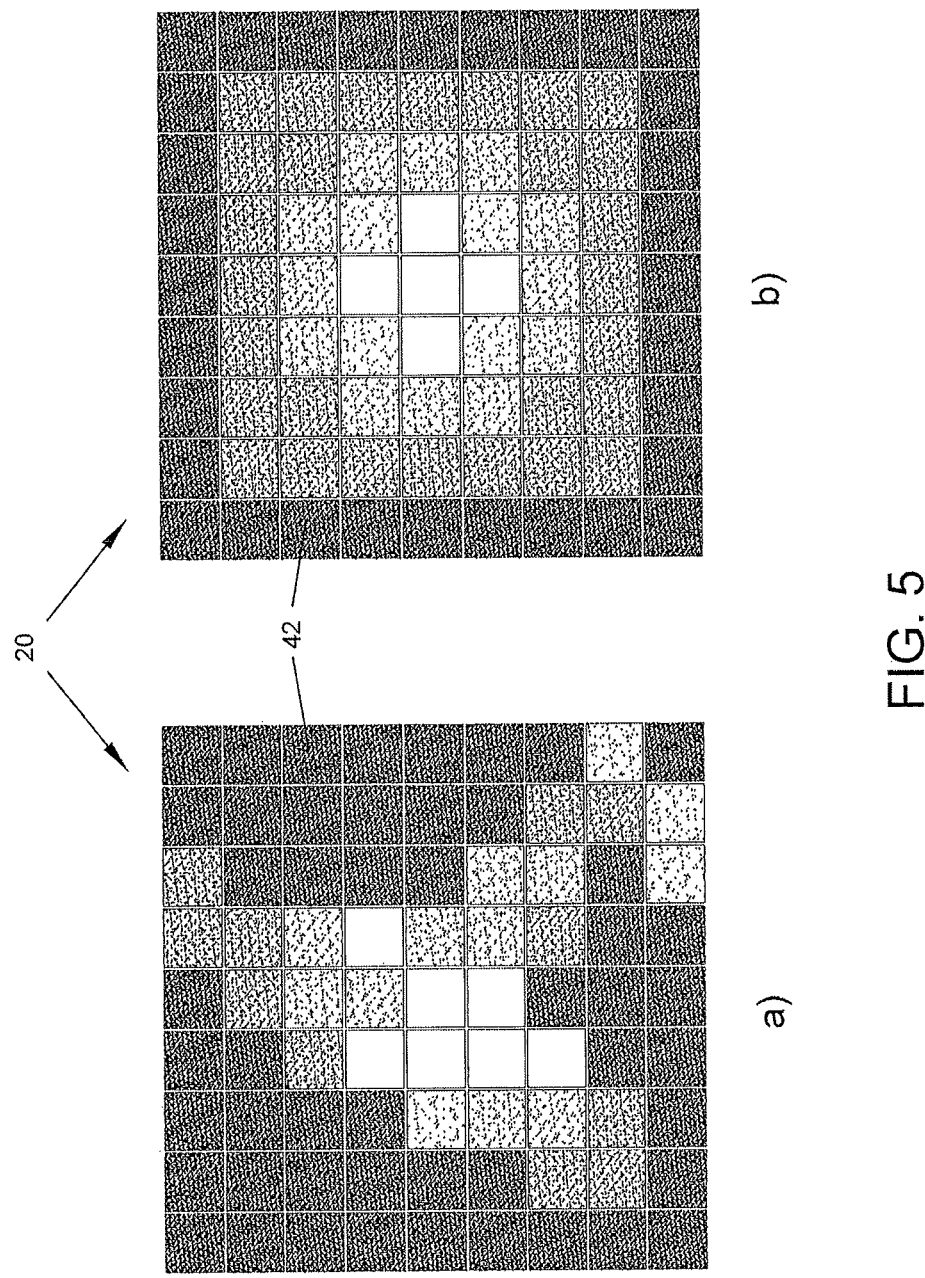

LASER SCANNING MICROSCOPE AND METHOD FOR CORRECTING IMAGING ERRORS PARTICULARLY IN HIGH-RESOLUTION SCANNING MICROSCOPY

RELATED APPLICATIONS

The present application is a nonprovisional application of provisional Patent Application Ser. No. 62/025,657 filed on Jul. 17, 2014 and claims priority benefit of Gelman Application No. DE 10 2013 218 795.5 filed on Sep. 19, 2013, the contents of each are incorporated by reference in their entirety.

FIELD OF THE INVENTION

The invention relates to a laser scanning microscope and to a method for correcting imaging errors, preferably in high-resolution scanning microscopy, particularly in scanning confocal microscopy.

BACKGROUND OF THE INVENTION

Various approaches are known from the prior art for increasing the lateral and axial resolution of such laser scanning microscopes even beyond the diffraction limit of the illumination light, and correcting imaging errors in the process.

Initially, a distinct contrast and resolution improvement was attained with confocal scanning microscopy. In so doing, a laser is used, which illuminates an object in the focal plane and excites fluorescence molecules at all points there. The fluorescence light is imaged on a pinhole in the image plane, only the light directly reaching the focal plane being detected. With confocal imaging, the lateral resolution (which is still diffraction-limited) can be greater by a factor of 1.4 than in conventional microscopy. This depends on the size of the pinhole. For this reason, the size of the pinhole must be optimized here to the size of the spot to be imaged. A pinhole that is too small reduces the amount of usable light, too large a pinhole leaves too much light outside the focal plane and admits too much scattered light.

Methods like I"M and 4Pi microscopy improve the axial resolution through the use of two objective lenses with high numerical aperture and superposition of the images in the detection plane either by wide field or confocal laser fluorescence configuration, or by the use of multiple excitation light sources, patterns due to interference being projected onto the sample. The lateral resolution remains unchanged in the process.

Other scanning high-resolution methods are RESOLFT (reversible saturable optical (fluorescence) transitions) microscopy, wherein especially sharp images are obtained. Instead of using conventional objective lenses and diffracted beams, a resolution far beyond the diffraction limit is obtained, down to the molecular scale. RESOLFT microscopy overcomes this diffraction limit by temporarily switching the dyes into a condition wherein they are no longer able to respond with a (fluorescence) signal following illumination.

Special methods of non-scanning optical microscopy, more precisely of fluorescence microscopy, are known as the PALM (photoactivated localization microscopy) method or the STORM (stochastic optical reconstruction microscopy) method. They rely on light-controlled on-and-off switching of fluorescence in individual molecules. In the process, switching on and off is accomplished beyond a certain time interval, during which several individual images can be taken. By means of a subsequent computer calculation, the position of individual molecules can be defined with a resolution beyond the optical resolution limited described by Ernst Abbe.

A microscopy method with increased resolution is known from EP 2 317 362 A1, wherein the illumination or the illumination pattern is shifted, with respect to the detection, with an accuracy exceeding the achievable optical resolution, and several images are taken and evaluated during the shift.

Moreover, it has long been known to use adaptive optics, that is, optically active components, for wavefront modulation. The adaptive optics deliberately alters the phase and/or the amplitude of the light in such a manner that both shifting and forming of the focus in the space, as well as correction of aberrations, if any, can be accomplished. An axial shift of the is achieved by a change of the wavefront. Here, an axial shift of the focus corresponds to a spherical change of the wavefront, a lateral shift to tilting of the wavefront. Aberrations in the beam path are also compensated by changing the wavefront. These manipulations are carried out in an aperture plane of the beam path with the aid of deformable mirrors.

Such adaptive optics systems are described for example in EP 1 253 457 B1, US 7 224 23 B2 or JP 2008 026643 A.

The use of adaptive optics for correcting, for example, sample-induced wavefront errors (including wavefront errors due to the sample carrier and the immersion medium), is known from a multitude of publications.

The problem in implementing adaptive optics is always that a control signal is required for the adaptive optics. It is also necessary to initially specify the wavefront error before it can be removed. Generally, the wavefront error is not known.

Two solution approaches exist in the prior art: in the first solution, an additional measuring system is brought into the microscope so as to directly measure the wavefront error, e.g. by means of an ordinary and known Shack-Hartmann sensor. US 2004/0223214 A1 shows for example a microscope with a Hartmann-Shack wavefront sensor. From the shape of the wavefront, the aberrations which were caused by scattering of the light in the sample can be defined. Depending on performance (correction degrees of freedom of the correction element), various effects can thus be corrected. In elements with very many degrees of freedom, such as an SLM (spatial light modulator) for example, this corresponds to the number of controllable pixels. With such elements, not only aberrations (slowly varying wavefronts) of the system and of the sample, but also high-frequency components (scattered light) can be corrected, to the extent that these can still be measured at the wavefront sensor. In a particular image segment, depending on the scan position, this sometimes very high-frequency wavefront is thus corrected at the element. Consequently, the diffraction-limited performance of the system can also be attained in media or scattering samples, and particularly also for non-vanishing system aberrations of the microscope.

As a consequence, valuable photons only available in a finite number must be for a sensor; these photons are subsequently no longer available for the actual measurement.

In the second solution, the wavefront error is defined iteratively directly from the LSM signal, i.e. the wavefront is optimized until the LSM signal is optimal. For this purpose, a large number of iteration cycles is needed; 10 to 30 cycles are reported in the literature.

Fluorophors fade and can only emit about 50,000 photons. In both prior art solutions, therefore, the disadvantage arises that many of the few photons must be "sacrificed" for determining the control signal for the adaptive mirror.

In conventional scanning microscopes (other than STED), as a matter of principle, diffraction-limited imaging of the (ideally point-like) spot as a so-called Airy disk takes place, which is defined by a point response or point image function, or point-spread function—PSF. The PSF expresses how an idealized, point-like object is imaged by a system. What is problematic is that suitable sensors capable of imaging the Airy disk in the sub-mm range at the desired resolution are not currently available, and other techniques are either very expensive or very slow and are thus not suitable for commercial use.

In conventional scanning microscopy, the imaging spot is evaluated pixel-wise, i.e. for each spot position exactly one pixel is evaluation or one pixel of the total image results from each spot position. Here, only the overall beam intensity (integral) captured by the detector is defined and converted into grey levels. If applicable, suitable pixel or information superposition can take place for small scanning steps. Contrast improvement can be attained here by increasing the grey-scale resolution (color depth). The PMTs (photomultiplier tube) or PMT arrays employed exhibit internal noise at certain amplification ratios, with the result that signal quality declines.

In all these solutions, the problem typically arises that the aberrations vary at different positions on the sample and with different focus positions. These are unknown for the most part, or must be determined by elaborate measurements.

Due to the limited photon yield in fluorescence microscopy, additional measurement of the actual PSF has not been common (or only in wide-field microscopy) up until now.

In a laser scanning microscope, the theoretical PSF can be interfered with by various deviations of the system from the ideal condition or of the sample to be observed. The signal thus becomes interference-prone (noise, signal-to-noise ratio . . . ) and the maximum resolution is reduced.

An object of the invention is to create a scanning microscope and a method for location-dependent aberration correction in the preferably high-resolution scanning microscope.

This is achieved by a laser scanning microscope with the features of claim 1 and by a method with the features of claim 6.

Advantageous modifications and exemplary embodiments are presented in the sub-claims.

The aberrations depend on various influential quantities. The aberrations of the optics of a scanning microscope are known and can be suitably corrected. Sample- and environmentally-dependent refractive index fluctuations, temperature fluctuations and various cover glass thicknesses vary to that effect according to the sample, but are largely constant for each sample. Properties of typical biological samples are often locally only slowly varying. One exception to this is imaging in deep samples, where stronger location-dependence exists due to scattering and a greater correction effort is consequently required.

SUMMARY OF THE INVENTION

The present invention solves the aforementioned problem. The SR-LSM signal (SR-LSM: super resolution laser scanning microscope), unlike an ordinary LSM signal, contains not only the photon count, but also information regarding the lateral intensity distribution of the PSF.

The integral over the intensity measured at the detector gives information regarding the grey value at the location (scanning position x, y), which is accomplished by the setting at the scanning mirror.

The form, or lateral resolution, of the PSF can now be used to define the aberrations in the system, which represent the deviation of the measured values compared to the ideal PSF without aberrations and, in a preferred embodiment, are corrected by means of an element (adaptive optics unit). To this end, the signals of the individual detectors of the detector array are evaluated. In alternative embodiments, the correction can also be implemented in software by means of digital post-processing of the microscope image, e.g. using deconvolution.

The PSF determined in this manner thus also contains the information regarding the wavefront error. Thus, conclusions can ideally also be reached from the PSF regarding the wavefront error. This can be accomplished purely by calculation, i.e. by iterating an assumed wavefront error until the calculated PSF is similar to the measured PSF. Using the correction value thus determined by calculation, the adaptive mirror is controlled in the preferred embodiment. In the ideal case, the wavefront error is already corrected in the second measurement. Adjoining field points always have similar wavefront errors, so that the second measurement can already take place at an adjoining field point (scanning position). The PSF then measured can then deviate from the ideal PSF due to the slight spatial variation of the wavefront error; from this slight deviation, an easily adjusted wavefront correction can again be determined by calculation.

At the next scanning position, the slightly corrected wavefront correction is then used for measuring. In iterative continuation of the method, it consequently follows that no photons need be "sacrificed" for the signal registration for controlling the adaptive optics, and the slowly varying wavefront errors that are present can nevertheless be corrected.

A laser scanning microscope according to the invention initially includes, in known fashion and arrangement, the components of an illumination device; scanner; adaptive optics unit; and detector.

Thus, the laser scanning microscope includes an illumination device for providing an illumination spot, a scanner for moving the illumination spot over a sample to be examined at sequential scanning positions, an adaptive optics unit for controlling a wavefront of the illumination spot with a control device, and a detector for capturing a spatially resolved imaging spot emitted by the sample.

According to the invention, the detector includes an evaluation unit for determining a point-spread function ($PSF_{Abb}$) of the imaging spot in each scanning position. In the process, the point-spread function of the current scanning position is evaluated starting from the current, one or more prior or adjoining scanning positions, so as to control the adaptive optics unit with a control device.

Now the peculiarity of the detector is that it actually captures an imaging spot with spatial resolution very quickly in each scanning position. This means that the wavefront belonging to this PSF is determined from the two-dimensional image of the Airy disk of the imaging spot by means of a suitable evaluation. As the ideal PSF is known, not only a light yield (as before), but also aberrations such as for example defocus, coma, astigmatism can be extracted from this for each scanning position.

The resolution increase at the LSM with this special detector can be explained the total PSF of the LSM system, which contributes decisively to image formation. This is calculated from the product of the excitation PSF and detection PSF convolved with the transfer function of the pinhole $$PSF_{Total}(x,y) = PSF_{Illumination}(x,y) \cdot [PSF_{Detection}(x,y) * T_{Pinhole}(x,y)].$$

The maximum resolution is achieved if the transfer function of the pinhole corresponds to a delta function. Then the maximum resolution is achieved. With this transfer function, however, hardly any light goes through the detector. Consequently, in practice an expanded pinhole is always so as to obtain sufficient photons for a suitable signal-to-noise ratio. A resolution loss always accompanies this, however. In the SR LSM, the array detector is situated at the location of the confocal pinhole. Each pixel of the detector array corresponds to a very small pinhole. Despite this, altogether, no light is excluded. From the evaluation of the intensities at each pixel, the maximum resolution of the detector can now be improved. This procedure is explained in DE 10 2012 204 128 A1, not pre-published, the disclosure content whereof is included here in its full scope.

Here, what matters for the algorithm for extracting the correction wavefront is only the pixel- or spatially-resolved PSF.

In order to achieve sub-pixel resolution at this scale, the imaging spot is supplied to a detector array (PMT array) by means of an optical deflection element which subdivides the imaging spot into subpixels (fiber optics, micro-mirror array).

Preferably, the detector is an array of individual detectors. PMTs (photomultiplier tubes) or APDs (avalanche photodiodes) are especially suitable. The individual tubes of the PMTs have a diameter of about 0.8 to 2 mm. There are embodiments with 8, 16, 32, 64 and more channels (tubes). In the arrangement in an array, a separation comparable to the microplates (MCP) is present between the tubes.

The optical deflection element preferably has only small separations between the individual elements (optical fibers, micro-mirrors), making it possible to better resolve the image information of the imaging spot. The light quantities of these individual elements are then directly supplied to the inputs of the individual detectors.

An especially preferred deflection element has at its input a bundle of optical fibers (alternatively, an array of micro-mirrors which can have different inclinations, facetted mirror, DMD or adaptive mirror), which are densely packed into a (nearly) circular cross-section. The cross-section must be matched to the imaging spot. The number of individual elements is to be selected according to the detector array used. Advantageously, a 9×9 PMT array can be used.

An output of the deflection element is configured so as to supply the light quantities of the individual elements to the individual detectors.

With the help of the two-dimensionally resolved Airy disk according to the invention, aberrations (even those of higher order) can be detected and the image representation can be adjusted (corrected) to the ideal $PSF_{ideal}$.

Preferably, the information of the Airy disk can be used, directly or after integration, in a suitable control loop for directing the adaptive optics unit to the next scan position, so as to thereby compensate optical aberrations caused by the sample.

In the process it is crucial that, for each scan position of the imaging spot captured in an individual image, capture occurs at a resolution which is at least twice as high, considering the imaging scale, as a full width at half maximum of the diffraction-limited individual image.

According to the invention, the use of adaptive optics is accomplished in synchronization with the scanning system. Thus, for each scanning position, a local deviation is compensated through the use of a specific correction function. The PSF is thereby improved, which in turn leads to an improved signal-to-noise ratio. Consequently, the option is available, not present in the wide field, of capturing even location-dependent aberrations by correcting the wavefront in every field (scanning) position.

The advantages of the invention are particularly considered to be that a rapid intensity measurement is possible using the novel detector (SR-LSM). This offers the singular possibility of accomplishing a rapid measurement of the PSF for a scan setting. In the process, the correction of the wavefront can be accomplished immediately ("on the fly"), or for example even in post-processing (subsequent deconvolution with the measured PSF). For both methods, it is important to know the PSF.

The signal of the detector is used for defining the deviations of the measured $PSF_{Abb}$ from an ideal PSF at each scanning position and making them available for correction. In particular, the wavefront correction can include the wavefront measurement of the previous scanning position, which in slowly varying samples makes possible a quicker convergence of the algorithm and thus adversely affects scanning speed even less. To this end, a control device for the adaptive optics unit is configured in such a way that a correction function is determined by comparison of the PSF of the imaging spot at a scanning position with an ideal $PSF_{ideal}$.

An evaluation unit of the detector array (e.g. 64- or 81-channel PMT array) determines the PSF of the imaging spot with spatial resolution at the resolution of the detector array.

By obtaining this information, not available up until now for an imaging spot, it is now possible in principle to also detect for the first time location-dependent (scanner setting-dependent) aberrations and to correct them by applying fast adaptive optics.

From this information, at least the focus of the PSF is defined.

Based on the location of the focus, a focus deviation in the lateral or axial direction can for example be determined.

In addition, the determination of higher-order imaging errors, such as astigmatism, coma or various distortions or aberration-typical symmetry alterations of the PSF, is optional.

Subsequently, a wavefront correction signal is determined from the PSF and the adaptive optics unit, known in as such and, controlled accordingly, so as to compensate the detected deviations in each scanning position (on the fly).

The wavefront correction signal is transmitted in a forward loop to the adaptive optics unit, so as for example to influence the wavefront signal in an adjoining or in the current scanning position.

While the scan optics unit scans, the adaptive optics unit is initially controlled with the laser scan signal of the previous position. In the process, the system learns and the wavefront correction signals determined are stored in a look-up table, preferably for each scan position. With each scan, the correction data can then be refined and the look-up table updated. The look-up table is also available in particular for possible post-processing (deconvolution).

The wavefront correction signal is triggered in such a way that it is imprinted at respective scan position, either of the illumination (NDD), of the detection PSF (detection only), both (common path), whereby a stepwise approximation of a nearly distortion-free PSF is accomplished.

At a first scanning position (n=1, m=1), a first wavefront error $W_{(1,1)}$ is determined from the spatially resolved PSF. This wavefront error is for example represented as a sum of Zernike wavefront errors.

$$W_{n,m} = \Sigma_i (A_{i;n,m} \cdot Z_i),$$

where i=4 ... 25 for e.g. 25 Zernike polynomials;
  $z_4$=defocus,
  $z_{5/6}$ astigmatism,
  $z_{7/8}$ coma,
  $z_9$ spherical aberration,
  $z_{10/11}$ trefoil,
  $z_{12/13}$ higher astigmatism,
  $z_{14/15}$ higher coma,
  $z_{16}$ higher spherical aberration, ...
and A(i;n,m) as the amplitude of the i-th Zernike wavefront error at the scanning position (n, m). The signal at the first scanning position must not be corrected in most applications; this image information is more or less "dispensed with."

At the second scanning position, n=2, m=1, correction is performed using the wavefront error $W_{(1,1)}$. The real wavefront error $W_{(2,1)}$ deviates slightly from the correction value entered. The difference of the measured PSF at scanning position (2,1) is used to define a better wavefront correction value. The amplitudes $A_{i;n,m}$ are slowly-varying functions of the scanning positions (n,m). The field pattern of the amplitudes can usually be represented with low-order polynomials, e.g.

$$A_{i;n,m} = \Sigma_k B_{i,k} \cdot F_k$$

with amplitudes $B_{i,k}$ and field pattern basis polynomials $F_k$, such as e.g. $F_k=2(x-1)$ for a linear progression in x and constant in y. Thus the wavefront error is represented in a double series expansion:

$$W_{n,m} = \Sigma_i \Sigma_k (B_{i,k} \cdot F_k) * Z_i$$

Thus the probable wavefront error at the next field point (n+1;m) or (n,m+1) can be calculated in advance from measurements known in advance, and the adaptive mirror controlled with this pre-calculated correction value.

In the simplest case, the gradients are defined from wavefront errors calculated at two adjoining measurement points, so as to estimate the wavefront error at the next field point by linear extrapolation.

After several field points, higher field pattern polynomials can also be carried along.

Of course, all known evaluations can be carried out with the detectors.

BRIEF DESCRIPTION OF THE DRAWINGS

In the following, the invention will be explained in more detail with reference to the figures. These show:

FIGS. 5 (a) and (b) are schematic views of a detector array with various measured intensities of individual detectors.

DETAILED DESCRIPTION OF THE DRAWINGS

Figure 1:
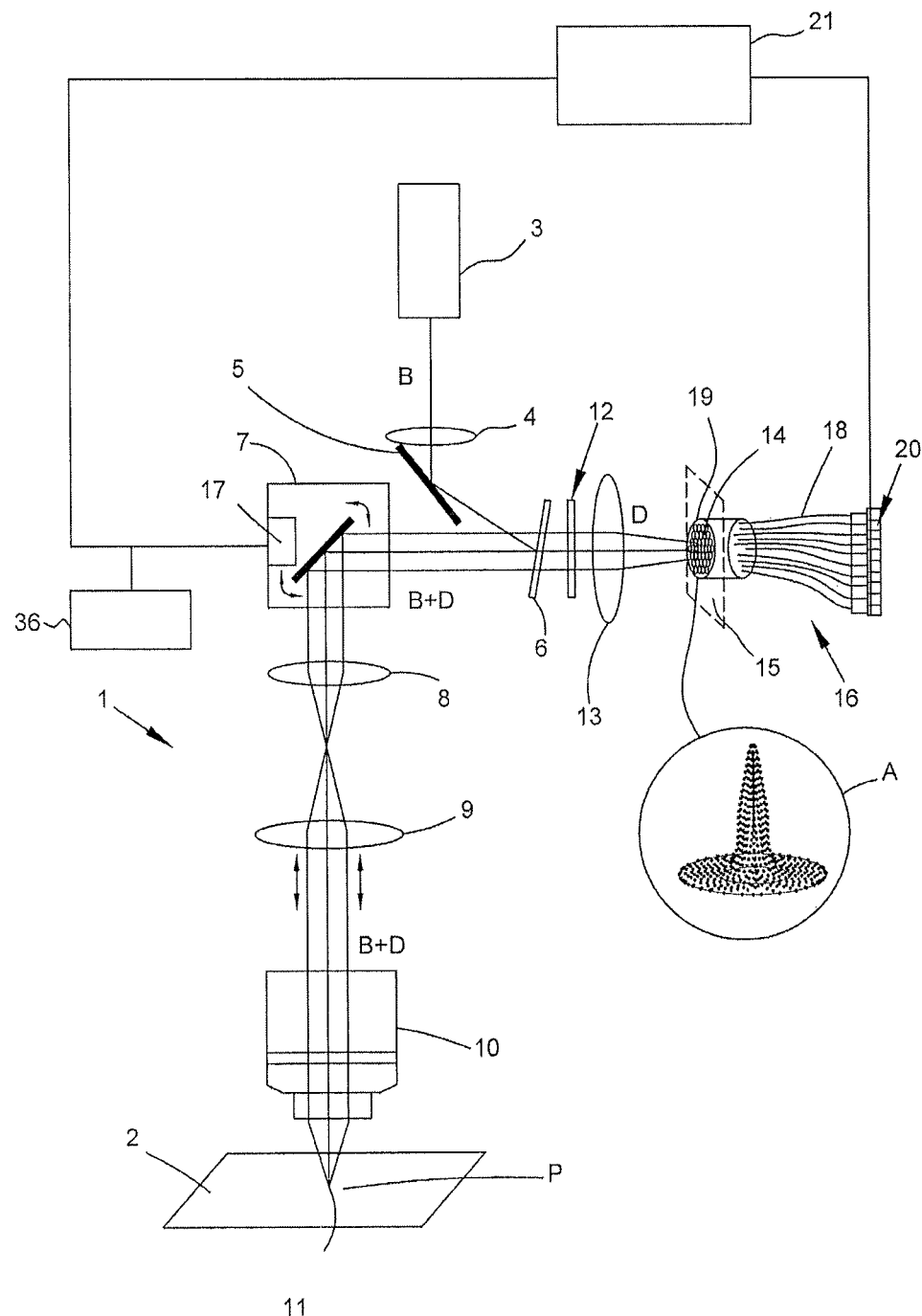
FIG. 1 is a schematic view of a super resolution laser scanning microscope (SR-LSM) according to the invention.

FIG. 1 shows schematically a super resolution laser scanning microscope 1 (hereafter abbreviated SR-LSM), which is configured for microscopy of a sample P placed in a sample carrier 2. The SR-LSM 1 is controlled by a control device, not shown, 36 and includes an illumination beam path B and an imaging beam path D. The illumination beam path B illuminates a spot in the sample P. The imaging beam path D images radiation captured/reflected in the sample in diffraction-limited fashion.

The LSM 1 is constructed in a known manner. A laser 3 is coupled into a mirror 5 through optics 4. The laser beam B is deflected by the mirror 5 through an angle of reflection onto the emission filter 6, where it is reflected and deflected onto a scanner 7. The scanner 7 provides for the scanning movement of the laser beam B over the sample P. The scanner 7 is advantageously equipped with an adaptive optics unit 17 for wavefront modulation. The adaptive optics unit 17 can also, however, be integrated at other locations in the illumination beam path B of the LSM 1 and be constructed in a known fashion.

The laser beam B is focused by means of a scan lens 8 and a tube lens 9 through an objective lens 10 into a spot 11 in the sample P.

Fluorescence radiation excited in the spot 11 (imaging beam path D) passes through the objective lens 10 and optics 9, 8 back to the scanner 7. Following the scanner in the imaging direction, a stationary light beam D is present. Emission filters 6 and 12 are positioned a known fashion in the imaging beam path D, so as to select the fluorescence radiation from the spot 11 with respect to its wavelength. An optics unit 13 provides for imaging the spot 11 as an imaging spot 14 (two-dimensional Airy disk) in a detection plane 15 at a certain size. The detection plane 15 is a conjugate plane or aperture plane of the plane of the spot 11. A detector captures the imaging spot 14 with spatial and intensity resolution.

A control device 36 controls all components of the LSM 1, particularly the scanner 7, detector 16 and an adaptive optics unit 17.

The detector 16 includes, in the embodiment shown, fiber optics as a non-imaging optical redistribution element, particularly a bundle of optical fibers 18. Here, each individual optical fiber 18 represents a pixel of the imaging spot 14. An input 19 of the bundle is positioned in the detection plane 15. Here, the optical fibers 18 are arranged tightly pressed or packed together so that a circle-like or nearly circular structure is formed which can completely capture the imaging spot 14.

The output ends of the optical fibers 18 are connected as output with the inputs of a detector array 20. The connection can be made fixed or releasable, with a plug for example. In this embodiment, the detector array 20 includes photomultiplier tubes (PMTs) or avalanche photodiodes (APDs) in the same number as require by the pixels in the detection plane 15. The PMTs operate sufficiently fast to be able to process the data captured by them in one and the same scan step.

A particular advantage of this arrangement consists in that the detector array 20, which is larger in terms of installation volume than the cross-section of the input 19 of the redistribution element or the fiber optics, can be located outside the detection plane 15 and can also have an arbitrary shape/arrangement of the individual tubes or elements, depending on the available installation space. If it were desired to use the detector array 20 directly in the imaging plane, then the imaging spot must be accordingly enlarged to the size of the detector array, which often presents a technical problem.

An evaluation unit 21 is connected downstream of the detector array 20, wherein the spatially- and intensity-resolved data of the detector array 20 are evaluated and processed. In the process, two-dimensional spatially resolved Airy disks are captured, which represent a PSF a focus position. In the process, the light quantity of a portion of the Airy disk is detected in each pixel of the detector. Thus radiation intensities can be captured with spatial resolution with the detector array 20, as indicated in Detail A (source Wikipedia: point spread function).

It is possible, knowing the PSF for various first- and higher-order aberrations, to calculate the type and magnitude of the aberrations present by means of a polynomial definition, and to subtract them out by means of a control loop. One skilled in the art knows the calculations required for this purpose and can implement suitable control routines and evaluation routines. In determining a grey value from the detected total light quantity for the final image pixel of the microscope image, these aberrations can be taken into account. If required, the Airy disks provide additional information in the sub-pixel domain, which can be significant for the adjoining pixels in the microscope image and are accordingly taken into account there.

The evaluation unit 21 therefore provides pixel data to an image processing unit, not shown. In addition, the data of the evaluation unit 21 are compared with an ideal PSF (Detail A) and the resulting correction wavefront delivered to the control of the adaptive optics unit 17, to be used at the next scan position for on-the-fly image correction.

Figure 2:
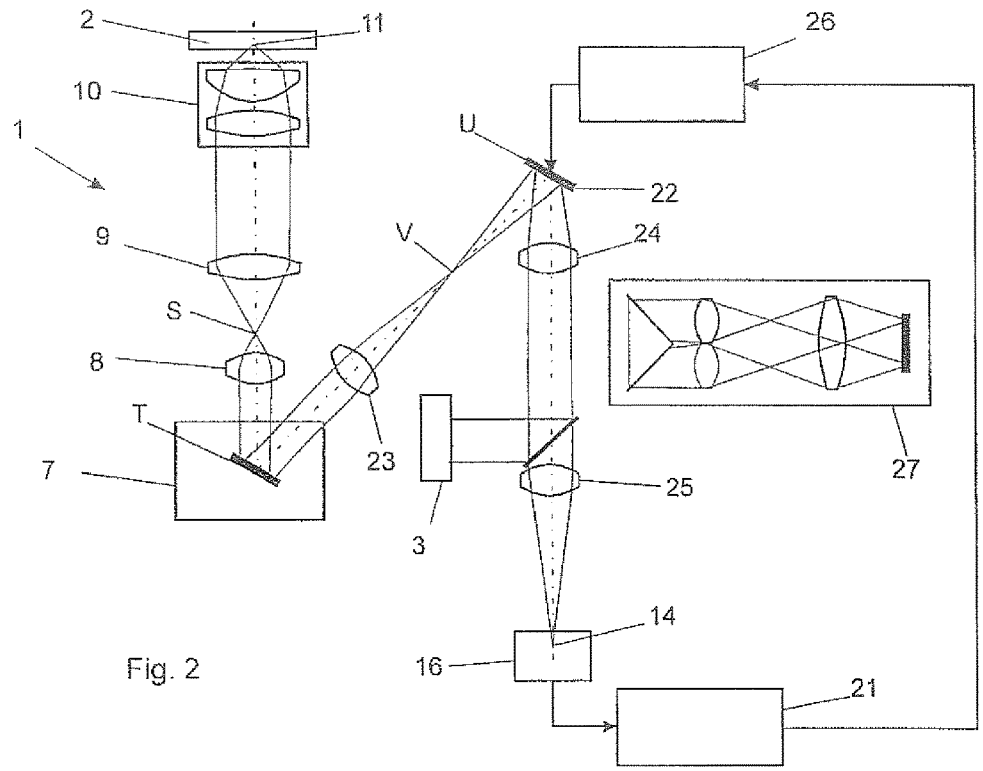
FIG. 2 is a schematic view of a preferred embodiment of the SR-LSM according to the invention.

A preferred embodiment of the SR-LSM is schematically shown in FIG. 2, wherein a separate adaptive optics unit is present. The microscope 1 serves in the manner described above for imaging the sample P, which is positioned in the sample holder 2, on the confocal detector 16. The detector 16 is constructed as described in the preceding figure and equipped with an optical redistribution element, not shown.

Illumination of the sample is also accomplished in known fashion by means of the laser source 3 which, with an adaptive mirror 22, is controllable in focal and lateral position and for correcting aberrations and is movable over the sample by means of the scanner 7. Imaging is accomplished in known fashion by means of the objective lens 10 and the tube lens 9 into an intermediate image S. From there, the light continues through the scan lens 8 into a conjugate aperture plane T, in which the scanner 7 is located. A second aperture plane U is generated by a first relay optics unit 23, in which the adaptive mirror 22 is located.

Another conjugate aperture plane, or an intermediate image V, is formed between the conjugate aperture plane U and a first relay optics unit 23. The intermediate image is imaged in the manner described in FIG. 1, by means of second relay optics unites 24, 25, on the detector 16. This delivers a signal to the evaluation unit 21. From the spatially resolved PSF determined here, a correction signal is determined which is provided to a control device 26 for controlling the adaptive mirror 22, thereby affecting the wavefront of the illumination beam path.

An optional connectable relay optics unit 27 with adaptive optics can be provided.

Figure 3:
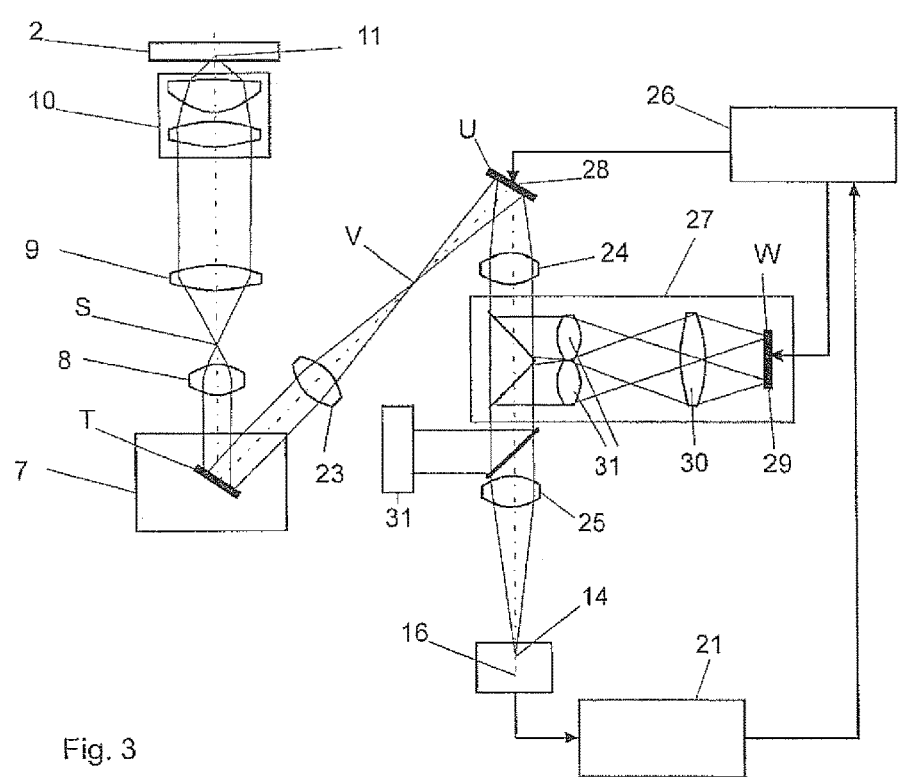
FIG. 3 is a modified embodiment of the SR-LSM shown in FIG. 2 with a connectable relay with adaptive optics.

FIG. 3 shows another embodiment of an SR-LSM 1 according to the invention in schematic view with a second (additional) adaptive optics unit. The SR-LSM 1 has the same basic design as that described earlier. Identical reference symbols refer to identical components.

A repeated description of these parts is therefore dispensed with here. Here, the SR-LSM 1 includes a second scan mirror 28 in the aperture plane U, which is (optionally) also configured as an adaptive mirror. The second relay optics unit 27 is placed as a connectable relay with a second adaptive mirror 29 in a third conjugate aperture W. This second relay optics unit 27 includes a common use optics unit 30 and separate optics units 31. One skilled in the art knows the construction of such optics units, so an extensive description is dispensed with here.

The adaptive mirror 22, 28, 29 is preferably a deformable mirror, the distortion of which can be controlled in such a way that a wavefront error that is present can be compensated. The system can also be designed in such a way that for example the first adaptive mirror 22, 28 is a rapidly deformable mirror for changing the focus position and spherical aberration, while the second deformable mirror 29 is for correcting non-axially-symmetric wavefront errors such as coma or astigmatism. Modular system expansion can consequently be accomplished, depending on variants in equipment.

In the evaluation unit 21, a detector signal of a first scan position is analyzed and first wavefront deformation determined, by guessing for example. From the knowledge of an wavefront signal, a correction signal can be determined, which is supplied to the control device The adaptive mirror or mirrors 22, 28, 29 are controlled using the correction signal for a second scanning position. At the detector 16, the signal or the image of the PSF is now captured for the second scanning position and compared to the first detector signal or the ideal PSF. Beginning with the signal of the second scanning position, a new wavefront distortion and the associated correction signal can be determined and the adaptive mirror consequently controlled for the following scanning position. This iterative process usually converges very rapidly. It is to be expected that, after three to eight cycles, the detector signal corresponds closely to the ideal PSF.

The iterative process can occur while the scanner 7 is being directed to the next scanning position. Adjoining scanning positions in the sample usually have very similar wavefront errors. The control device 26 for the adaptive mirror(s) 22, 28, 29 can be coupled with the transducer for the scan mirror 7.

Following definition of the first wavefront correction at a first scanning position, the scan mirror 7 moves to an adjoining second scanning position. For correcting, the wavefront distortions of the first scanning position are set. Based on the measurement at the current, second scanning position, the transducer determines a new, second wavefront correction, which is applied at an adjoining third scanning position. Consequently, during rapid measurement, the wavefront correction "limps" slightly behind the ideal correction.

The wavefront corrections associated with the scanning positions can be stored in a table as correction coefficients so that, during other measurements on the same or similar samples, the wavefront distortions need not be determined again, and an obvious starting point for optimization is present.

Figure 4:
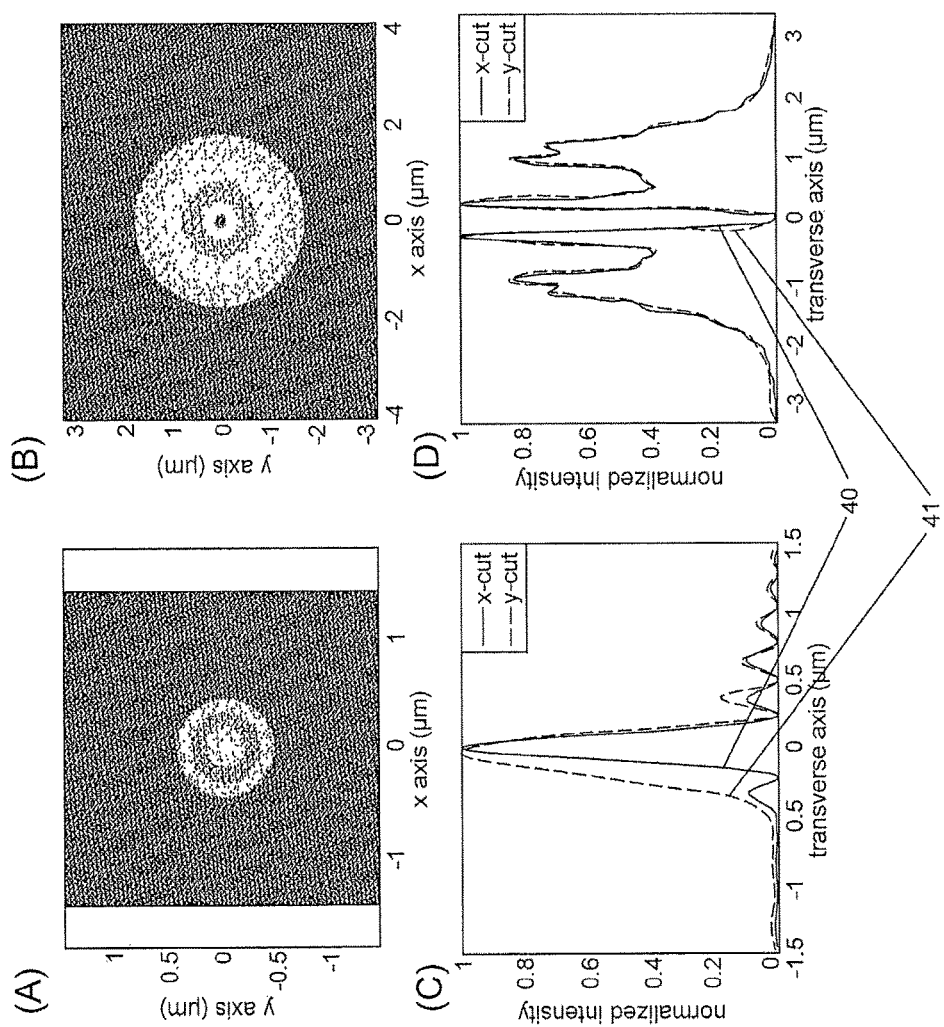
FIGS. 4(A)-(D) are spatially resolved PSF representations for various aberrations.

FIG. 4 shows two examples for spatially resolved images of a PSF (FIGS. 4(A) and 4(B)) and associated intensity distributions for various aberrations (FIGS. 4(C) and 4(D)). It is obvious from the figures how different aberrations, due to their symmetry, can be recognized from the shape of the envelope of the PSF. A PSF is shown in FIG. 4(A) with the coma imaging error, in FIG. 4(B) a PSF with the defocus imaging error.

FIGS. 4(B) and 4(C) show intensity profiles of the sensor signal for a section in the x-axis as the solid curve 40 and as a dotted line 41 for a section through the y-axis.

Asymmetry difference between the axial sections 40, 41 is clearly recognizable in FIG. 4(C). In FIG. 4(D), it can be seen that high intensities are present that are axially symmetric but distant from the center.

For detailed evaluation, all possible (naturally also eccentric) sections through the image of the PSF can be carried out and evaluated, so as to also detect and appropriately compensate higher-order aberrations.

FIG. 5 shows by way of example how an imaging spot 14 is detected as a PSF with spatial resolution with a detector array 20 consisting of for example 9×9 individual detectors 42. Here, different grey values represent different measured intensities of the individual sensors. In FIG. 4(*a*), a non-axisymmetric aberration is clearly recognizable, while FIG. 4(*b*) shows a nearly ideal PSF.

| | Reference Symbol List |
|---|---|
| 1 | SR-LSM: Super Resolution Laser Scanning Microscope |
| 2 | Sample holder |
| 3 | Laser |
| 4 | Optics unit |
| 5 | Mirror |
| 6 | Emission filter |
| 7 | Scanner |
| 8 | Scan lens |
| 9 | Tube lens |
| 10 | Objective lens |
| 11 | Spot |
| 12 | Emission filter |
| 13 | Optics unit |
| 14 | Imaging spot |
| 15 | Detection plane |
| 16 | Detector |
| 17 | Adaptive optics unit |
| 18 | Optical fibers |
| 19 | Input |
| 20 | Detector array |
| 21 | Evaluation unit |
| 22 | Adaptive mirror relay optics unit |
| 24 | Relay lens |
| 25 | Relay lens |
| 26 | Control device |
| 27 | Relay optics unit |
| 28 | Scan mirror |
| 29 | Adaptive mirror |
| 30 | Optics unit |
| 31 | Optics unit |
| 36 | Control Device |
| 40 | Axial section |
| 41 | Axial section |
| 42 | Individual detector |
| P | Sample |
| B | Illumination beam path |
| D | Imaging beam path |
| S | Intermediate image |
| T, U, V | Aperture planes |

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A confocal laser scanning microscope comprising:
    an illumination device for providing an illumination spot;
    said laser scanning microscope being a confocal laser scanning microscope and having a scanner for moving the illumination spot over a sample, which is supported by said laser scanning microscope, to be examined in an x-y plane to consecutive scanning positions, each scanning position being a field point of the scanned sample;
    an adaptive optics unit for controlling a wavefront of the illumination spot;
    a control device configured for controlling operation of the adaptive optics unit;
    a detector for directly capturing a spatially-resolved imaging spot emitted by the sample at each scanning position; and
    an evaluation unit downstream of said detector configured for:
        (i) continuously scanning the illumination spot across the sample;
        (ii) determining an actual point spread function of the imaging spot in each scanning position;
        (iii) determining deviations between an ideal spread function and the actual point spread functions at each said scanning position;
        (iv) determining a wavefront correction signal from said deviations of the point spread functions of adjoining field points in said x-y plane for each said scanning position;
        (v) supplying said correction signal to said control device for adjusting said adaptive optics unit; and
        (vi) repeating steps (i)-(v) while scanning said illumination spot across the sample.

2. The laser scanning microscope according to claim 1, wherein the detector includes a detector array made up of at least four individual detectors and a non-imaging redistribution element, an input of the redistribution element being positioned in a detection plane and the redistribution element distributing the radiation from the detection plane onto the individual detectors.

3. The laser scanning microscope according to claim 2, wherein the redistribution element includes a bundle of optical fibers, the optical fibers being grouped in a circle at the input and having a geometric arrangement differing from that of the input at an output facing the individual detectors.

4. The laser scanning microscope according to claim 1, wherein the redistribution element includes at least one micro-mirror array with micro-mirrors which can be given different inclinations.

5. The laser scanning microscope according to claim 1, wherein the detector is an array of avalanche photodiodes or photomultiplier tubes.

6. A method for correcting imaging errors in confocal laser scanning microscopy, comprising the following steps:
    (i) providing an illumination spot within said confocal laser scanning microscope;
    (ii) continuously scanning said illumination spot across a sample in an x-y plane;
    (iii) directly capturing a spatially-resolved imaging spot emitted by said sample at a each said scanning position in said x-y plane using a confocal laser scanning microscope;
    (iv) determining a $PSF_{Abb}$ of the imaging spot at each scanning position;

(v) determining discrepancies between a $PSF_{ideal}$ and the $PSF_{Abb}$ at each scanning position;

(vi) calculating a wavefront correction signal from said discrepancies of the point spread functions of adjoining field points in said x-y plane for each said scanning position;

(vii) supplying said correction signal to a control device for adjusting an adaptive optics unit with the wavefront correction signal; and (viii) repeating said steps while scanning said imaging spot across a sample.

7. The method according to claim 6, further comprising repeating the steps while summing the scanning positions, a correction coefficient being stored in a look-up table at each repetition.

8. The method according to one of claim 6, further comprising subdividing the wavefront correction signal into a first wavefront correction signal and a second wavefront correction signal, the first wavefront correction signal containing information about an axisymmetric correction and being used to control a first adaptive optics unit, and the second wavefront correction signal containing information regarding a non-axisymmetric correction and being used to control a second adaptive optics unit.

9. The method according to one of claim 6, further comprising capturing, for each scanning position, the imaging spot captured in an individual image with a spatial resolution which is twice as high, taking the imaging scale into account, as a full width at half maximum of the diffraction-limited individual image.

10. The method according to one of claim 6, further comprising accomplishing the determination of the $PSF_{Abb}$ of the imaging spot by evaluating measured intensities of individual detectors of a detector array, the positions of the individual detectors in the detector array being associated with pixels and the measured intensities being associated with grey values in the spatially resolved imaging spot.

11. The method according to claim 6, wherein the wavefront correction signal for each scanning position is taken into account in digital post-processing of a microscope image.

\* \* \* \* \*